United States Patent
Ogawa

(10) Patent No.: US 10,612,502 B2
(45) Date of Patent: Apr. 7, 2020

(54) FUEL SUPPLY APPARATUS FOR INTERNAL COMBUSTION ENGINE AND FUEL FILTER INSTALLING METHOD

(71) Applicant: VOLVO TRUCK CORPORATION, Gothenburg (SE)

(72) Inventor: Yoshiaki Ogawa, Ageo (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 890 days.

(21) Appl. No.: 14/922,067

(22) Filed: Oct. 23, 2015

(65) Prior Publication Data

US 2016/0040638 A1   Feb. 11, 2016

Related U.S. Application Data

(63) Continuation of application No. PCT/JP2013/062115, filed on Apr. 24, 2013.

(51) Int. Cl.
| | | |
|---|---|---|
| *F02M 37/00* | (2006.01) | |
| *F02M 37/22* | (2019.01) | |
| *B01D 35/00* | (2006.01) | |
| *B01D 35/14* | (2006.01) | |
| *B01D 35/30* | (2006.01) | |
| *B60K 15/067* | (2006.01) | |
| *B60K 15/063* | (2006.01) | |

(52) U.S. Cl.
CPC ....... *F02M 37/0076* (2013.01); *B01D 35/005* (2013.01); *B01D 35/14* (2013.01); *B01D 35/306* (2013.01); *F02M 37/22* (2013.01); *B60K 15/067* (2013.01); *B60K 2015/0636* (2013.01); *B60Y 2200/14* (2013.01)

(58) Field of Classification Search
CPC .. F02M 37/0076; F02M 37/22; B01D 35/005; B01D 35/306; B01D 35/14
USPC .............................................. 210/85; 29/428
See application file for complete search history.

(56) References Cited

U.S. PATENT DOCUMENTS

| 4,618,417 A | * | 10/1986 | Yamanouchi | .......... F02M 31/16 |
| | | | | 210/149 |
| 2005/0252847 A1 | * | 11/2005 | Urbahn | .............. B01D 35/0276 |
| | | | | 210/416.4 |
| 2010/0154727 A1 | | 6/2010 | Malgorn et al. | |

FOREIGN PATENT DOCUMENTS

| CN | 100421981 C | 10/2008 |
| CN | 201914078 U | 8/2011 |
| CN | 202038166 U | 11/2011 |
| EP | 1683673 A1 | 7/2006 |
| JP | 56-035378 | 8/1981 |

(Continued)

OTHER PUBLICATIONS

Chinese Office Action dated Dec. 27, 2016, which issued in Chinese Application No. 201380075837.6, and English language translation thereof.

(Continued)

*Primary Examiner* — Vishal V Vasisth
(74) *Attorney, Agent, or Firm* — Morgan, Lewis & Bockius LLP

(57) ABSTRACT

A fuel supply apparatus for an internal combustion engine has a fuel tank installed on the vehicle width outer side of a side frame and a fuel filter, which is disposed in a fuel supply passage for supplying fuel stored in the fuel tank to an internal combustion engine and which has a drain cock and a visual check part. The fuel filter is installed, vertically penetrating the fuel tank.

7 Claims, 9 Drawing Sheets

(56) References Cited

FOREIGN PATENT DOCUMENTS

| | | |
|---|---|---|
| JP | 04-005375 | 2/1992 |
| JP | 04-005375 | 3/2004 |
| JP | 2004-074991 A | 3/2004 |
| JP | 2004074991 A * | 3/2004 |
| JP | 2007-261349 A | 10/2007 |
| WO | 2008/105722 A1 | 9/2008 |

OTHER PUBLICATIONS

Japanese Office Action dated Nov. 8, 2016, which issued in Japanese Application No. 2015-513419, together with a partial English language translation thereof.
International Preliminary Report on Patentability dated Nov. 5, 2015, which issued in PCT/JP2013/062115; and English language translation thereof.
Chinese Office Action from Chinese Patent Application No. 201380075837.6, dated Jul. 18, 2017.
Indian Office Action from Indian Patent Application No. 10647/DELNP/2015, dated Jan. 18, 2019, 7 pages including English language translation.

* cited by examiner

FUEL SUPPLY APPARATUS FOR INTERNAL COMBUSTION ENGINE AND FUEL FILTER INSTALLING METHOD

This application is a continuation application of PCT/JP2013/062115, filed on Apr. 24, 2013, which is hereby incorporated by reference in its entirety for all purposes.

BACKGROUND OF THE INVENTION

1. Field of the Invention

The present invention relates to a fuel supply apparatus for an internal combustion engine and a fuel filter installing method.

2. Description of Related Art

In a fuel supply apparatus for an internal combustion engine, a fuel filter for removing foreign matters mixed in fuel is disposed in a fuel supply passage through which fuel stored in a fuel tank is supplied to an internal combustion engine. A fuel filter having a function for separating water from fuel is used in a diesel engine to protect a fuel injector or the like. In a daily inspection of a large vehicle, such as a truck, it is required to visually check the amount of water (the water amount) that has been separated through the fuel filter, and to operate, as necessary, a drain cock installed at the bottom of the fuel filter to drain the water. For this reason, a fuel filter is installed to the vehicle width outer side of a side frame extending in the longitudinal direction of a vehicle, as disclosed in Japanese Patent Application Laid-Open Publication No. 2007-261349.

However, since the fuel filter has to be visually checked, the fuel filter installed on a vehicle width outer side of the side frame prevents accessories or the like from being disposed on the outer side of the fuel filter. This has been inevitably producing a dead space on the vehicle width outer side of the fuel filter, interfering with the achievement of the effective use of a vehicle space.

SUMMARY OF THE INVENTION

Accordingly, an object of the present invention is to provide a fuel supply apparatus for an internal combustion engine and a fuel filter installing method which promote the effective use of a vehicle space.

A fuel supply apparatus for an internal combustion engine has a fuel tank which is installed on a vehicle width outer side of a side frame, and a fuel filter which is disposed in a fuel supply passage for supplying fuel stored in the fuel tank to an internal combustion engine and which has a drain cock and a visual check part. The fuel filter is installed, vertically penetrating the fuel tank.

Furthermore, there is provided a fuel filter installing method in which a fuel filter, which is disposed in a fuel supply passage for supplying fuel stored in a fuel tank installed on a vehicle width outer side of a side frame to an internal combustion engine and which has a drain cock and a visual check part, is installed such that the fuel filter vertically penetrates the fuel tank.

According to the present invention, a fuel tank and a fuel filter are integrated, thus making it possible to promote the effective use of a vehicle space.

DESCRIPTION OF PREFERRED EMBODIMENTS

Hereunder, embodiments for carrying out the present invention will be explained in detail with reference to the accompanying drawings.

Figure 1:
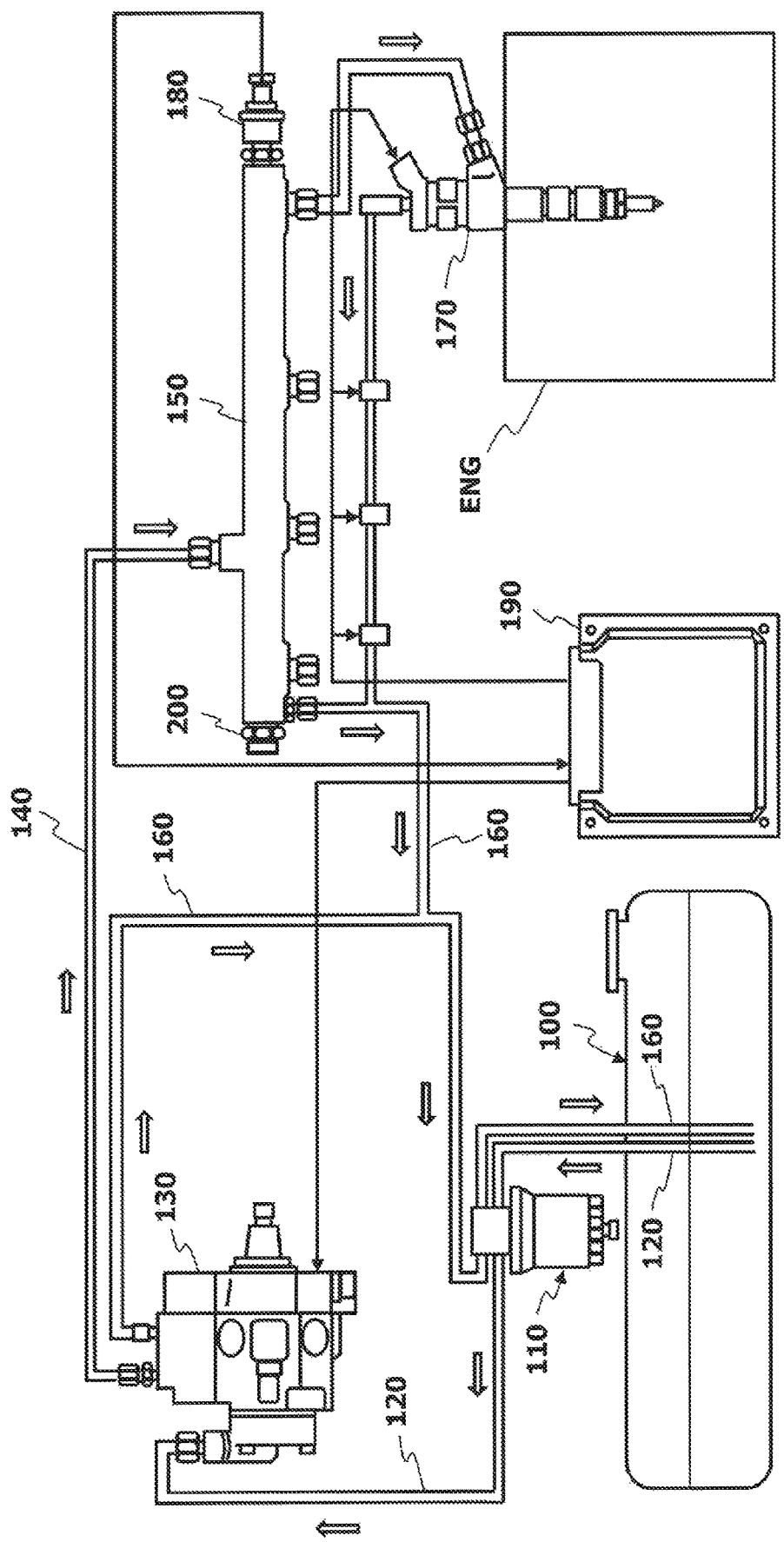
FIG. 1 is a schematic view illustrating an example of a common rail system.

FIG. 1 illustrates an example of a common rail system of a diesel engine (internal combustion engine) that is provided with a fuel supply apparatus according to the present embodiment.

Fuel (light oil) stored in a fuel tank 100 is supplied to a supply pump 130, which is driven by a diesel engine ENG, through a low-pressure fuel pipe 120 having a fuel filter 110, which removes foreign matters from the fuel and separates water from the fuel. The pressure of the fuel supplied to the supply pump 130 is increased to a specified pressure by the supply pump 130, and the fuel is supplied to a common rail 150 through a high-pressure fuel pipe 140. Furthermore, if the pressure of the fuel is increased to the specified pressure or greater for some reason in the supply pump 130, then a built-in relief valve is opened to return the fuel to the fuel tank 100 through a fuel return pipe 160 having the fuel filter 110. The low-pressure fuel pipe 120 and the fuel return pipe 160 may use, for example, rubber hoses, which permit easy routing, because the pressure of the fuel is relatively low.

The fuel filter 110 has a drain cock for draining the water separated from the fuel, and a visual check part which permits the visual check of the amount of water separated from the fuel. Furthermore, the fuel, from which foreign matters, water and the like have been removed through the fuel filter 110, is supplied to the supply pump 130. Therefore, the fuel filter 110 does not have to be necessarily disposed in the fuel return pipe 160. Furthermore, the fuel filter 110 may be disposed in the high-pressure fuel pipe 140, but is preferably disposed in the low-pressure fuel pipe 120 so as to prevent foreign matters from entering the supply pump 130. The low-pressure fuel pipe 120 and the high-pressure fuel pipe 140 are examples of the fuel supply passages for supplying the fuel stored in the fuel tank 100 to the diesel engine ENG.

In the case of, for example, a 4-cylinder diesel engine ENG, the fuel supplied to the common rail 150 is divided and supplied to an injector 170 attached to the cylinder head of each cylinder, and injected into a combustion chamber. The fuel injection amount and the fuel injection timing are determined based on the operation state of the diesel engine ENG. Furthermore, the fuel not injected from the injectors 170 is returned to the fuel tank 100 through the fuel return pipe 160.

The common rail 150 has a fuel pressure sensor 180 which detects the pressure of the fuel accumulated therein (the fuel pressure). An output signal of the fuel pressure sensor 180 is input to a control unit 190 with a built-in microcomputer. The control unit 190 electronically controls a flow rate control valve built in the supply pump 130 such that the fuel pressure detected by the fuel pressure sensor 180 reaches a specified pressure. The common rail 150 is further provided with a relief valve 200 which opens when the fuel pressure reaches an allowable upper limit value. The fuel that has come out of the relief valve 200 is returned to the fuel tank 100 through the fuel return pipe 160. Furthermore, the control unit 190 determines the fuel injection amount and the fuel injection timing based on the operation state of the diesel engine ENG, and outputs an operation signal to each of the injectors 170 at a predetermined timing.

Figure 2:
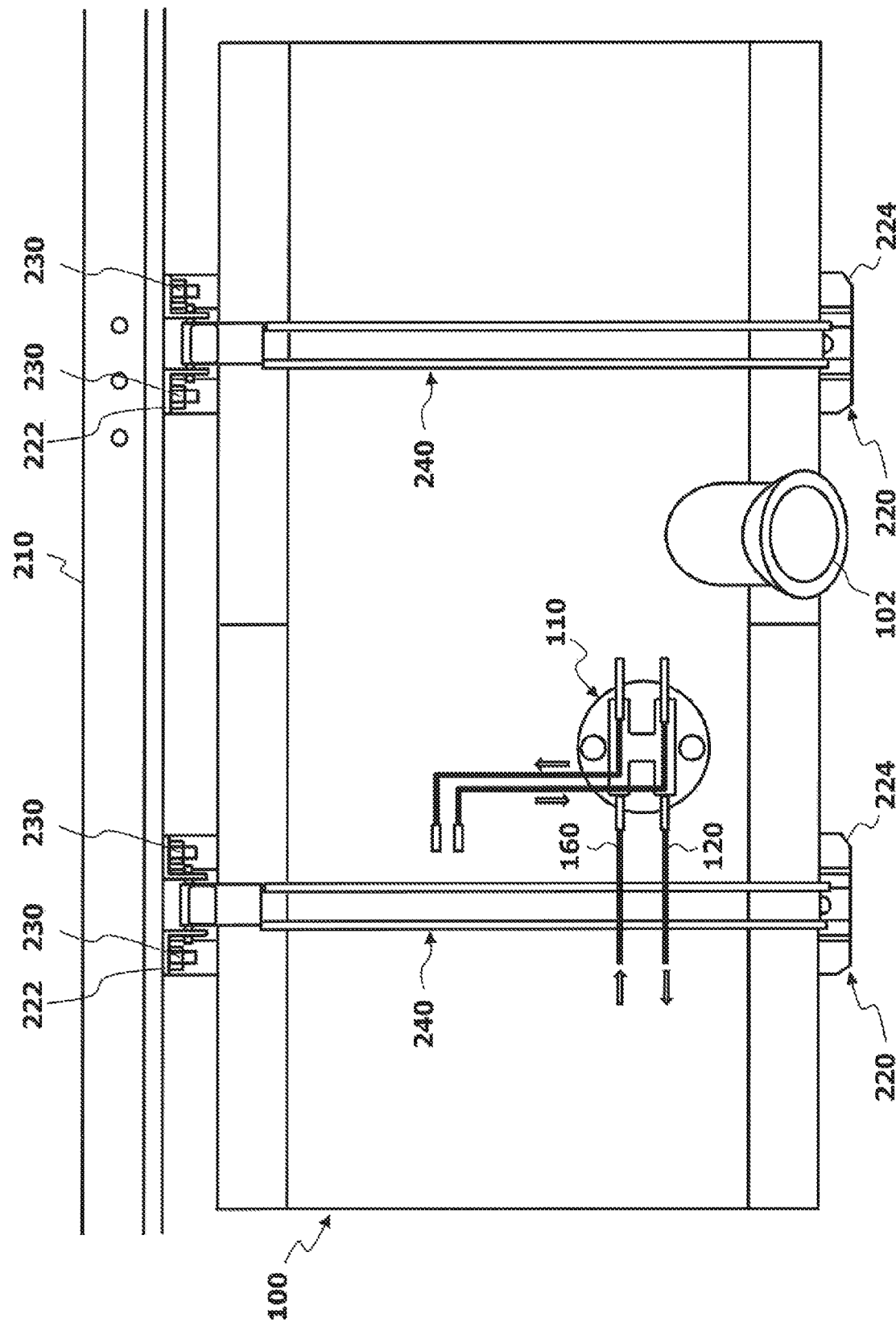
FIG. 2 is a plan view illustrating an example of a method for installing a fuel tank and a fuel filter.
Figure 3:
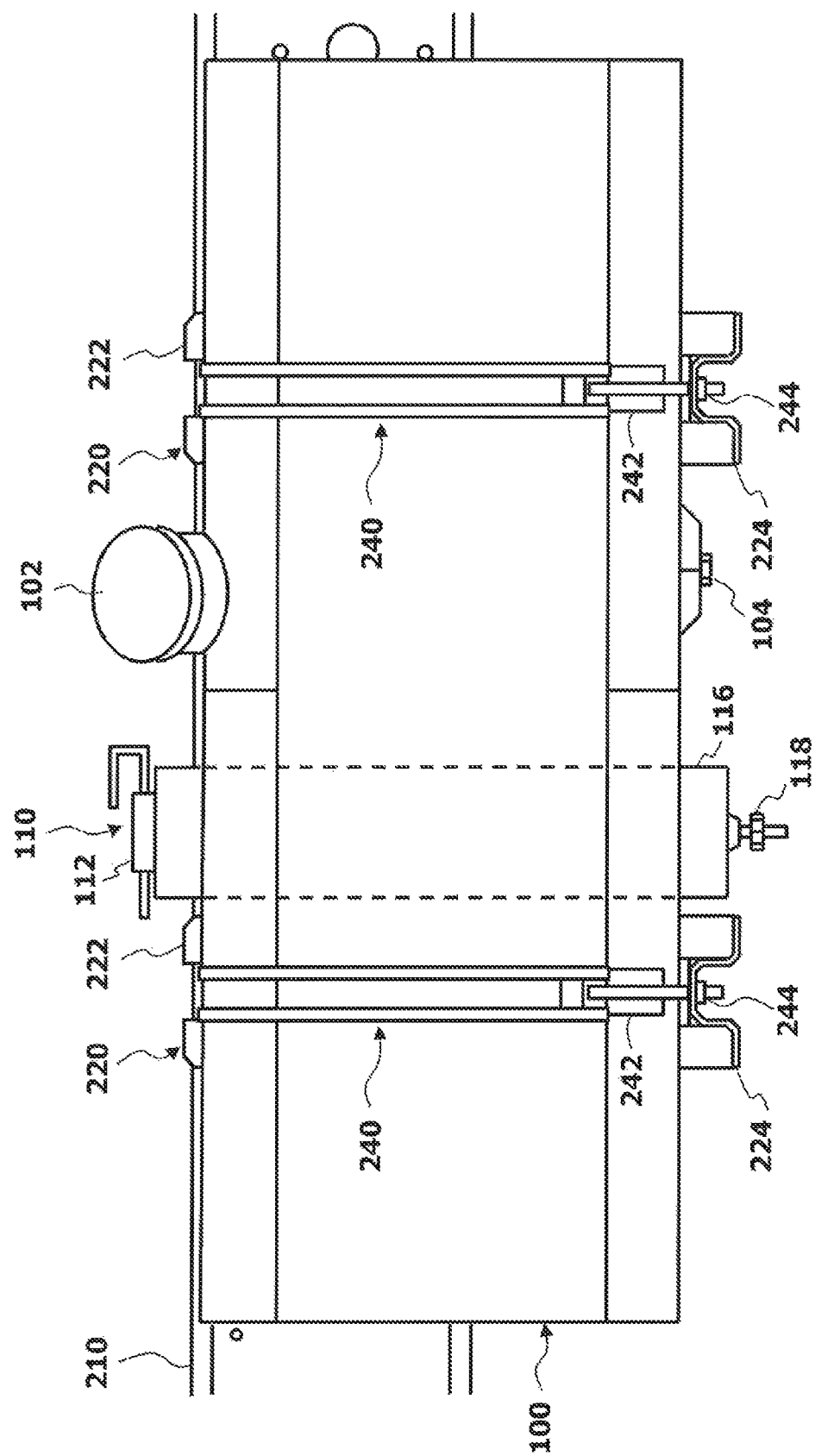
FIG. 3 is a side view illustrating the example of the method for installing the fuel tank and the fuel filter.

FIG. 2 and FIG. 3 illustrate an example of the method for installing the fuel tank 100 and the fuel filter 110.

On an outer surface positioned on the vehicle width outer side of a side frame (side rail) 210 extending in the longitudinal direction of the vehicle, a pair of brackets 220, which are approximately L-shaped, is fixed by, for example, fastening members 230 including bolts and washers. As the fastening members 230, rivets or the like may be used. Each of the brackets 220 has an approximately hat-shaped cross-section and includes a first member 222, the member axis of which extends in the vertical direction, and a second member 224, the member axis of which extends toward the vehicle width outer side from the bottom end of the first member 222.

One end of a strap 240, which is approximately L-shaped to fit the upper surface and one side surface of the fuel tank 100, is rotatably fixed, that is, the strap 240 is openably and closably fixed, to the upper end portion of the first member 222. Furthermore, a portion of the second member 224 that is positioned on the vehicle width outer side has an insertion hole (not illustrated), into which a bolt 242 fixed to the other end of the strap 240 is inserted.

Furthermore, the fuel tank 100 having an approximately rectangular parallelepiped shape is placed on the upper surfaces of the second members 224 of the brackets 220, and the straps 240 are closed, thereby fixing the fuel tank 100 to the brackets 220. In short, the fuel tank 100 is installed on the vehicle width outer side of the side frame 210 through the brackets 220. For the convenience of the fuel replenishment, the fuel tank 100 is installed with a fuel filling port 102 facing toward the vehicle width outer side.

At this time, the bolts 242 fixed to the other ends of the straps 240 are inserted in the insertion holes opened in the second members 224, and the fastening members 244 including, for example, nuts and washers, are screwed to the external threads of the bolts 242. This makes it possible to securely fix the fuel tank 100 to the brackets 220.

The fuel filter 110 is installed to the portion of the fuel tank 100 that is adjacent to the vehicle width outer side such that the fuel filter 110 vertically penetrates the fuel tank 100. The fuel filter 110 may be fixed to the fuel tank 100 by a publicly known means, such as screwing bolts to small brackets attached to the upper surface of the fuel tank 100.

Figure 4:
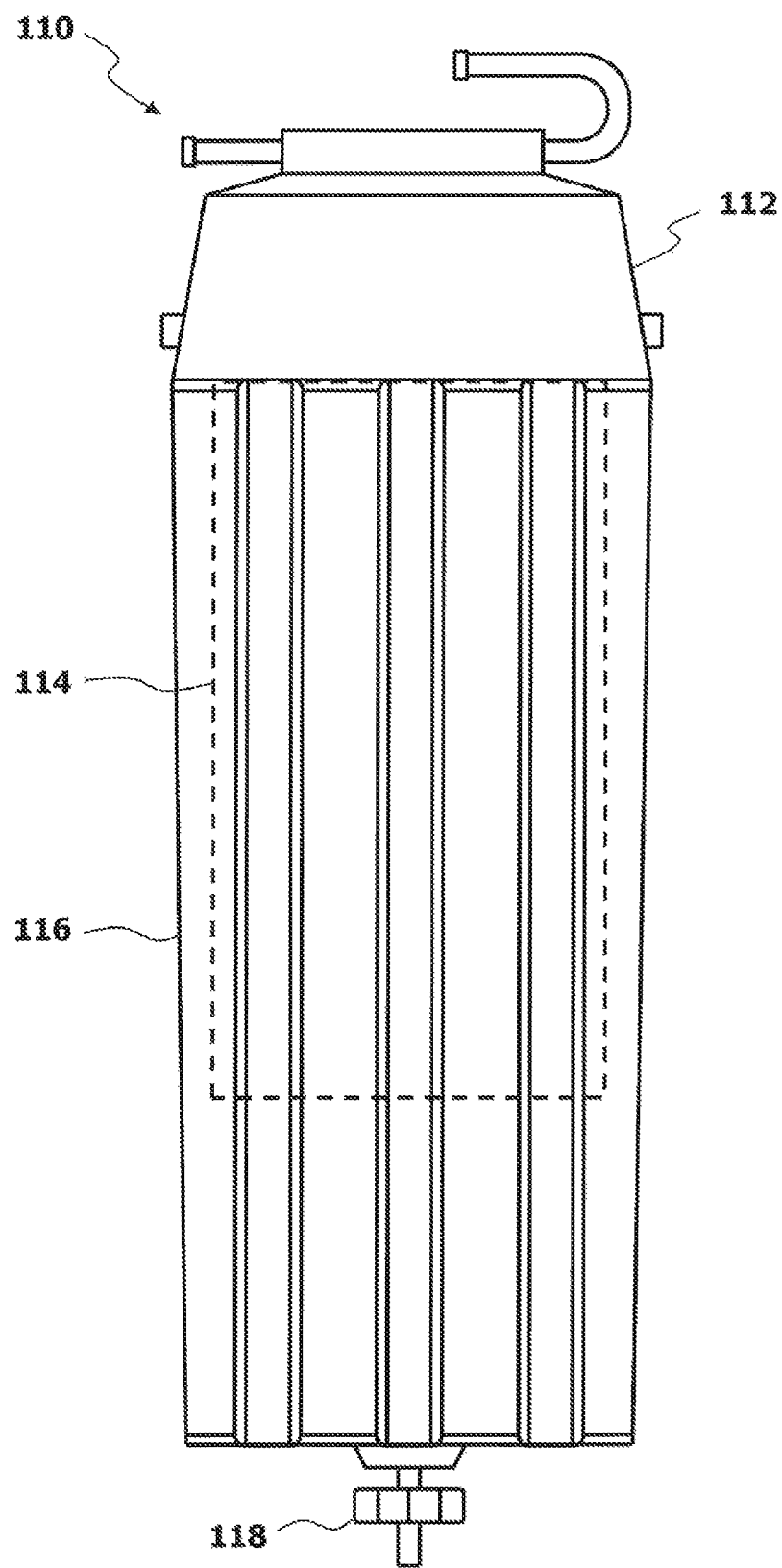
FIG. 4 is a side view illustrating an example of the fuel filter.
Figure 5:
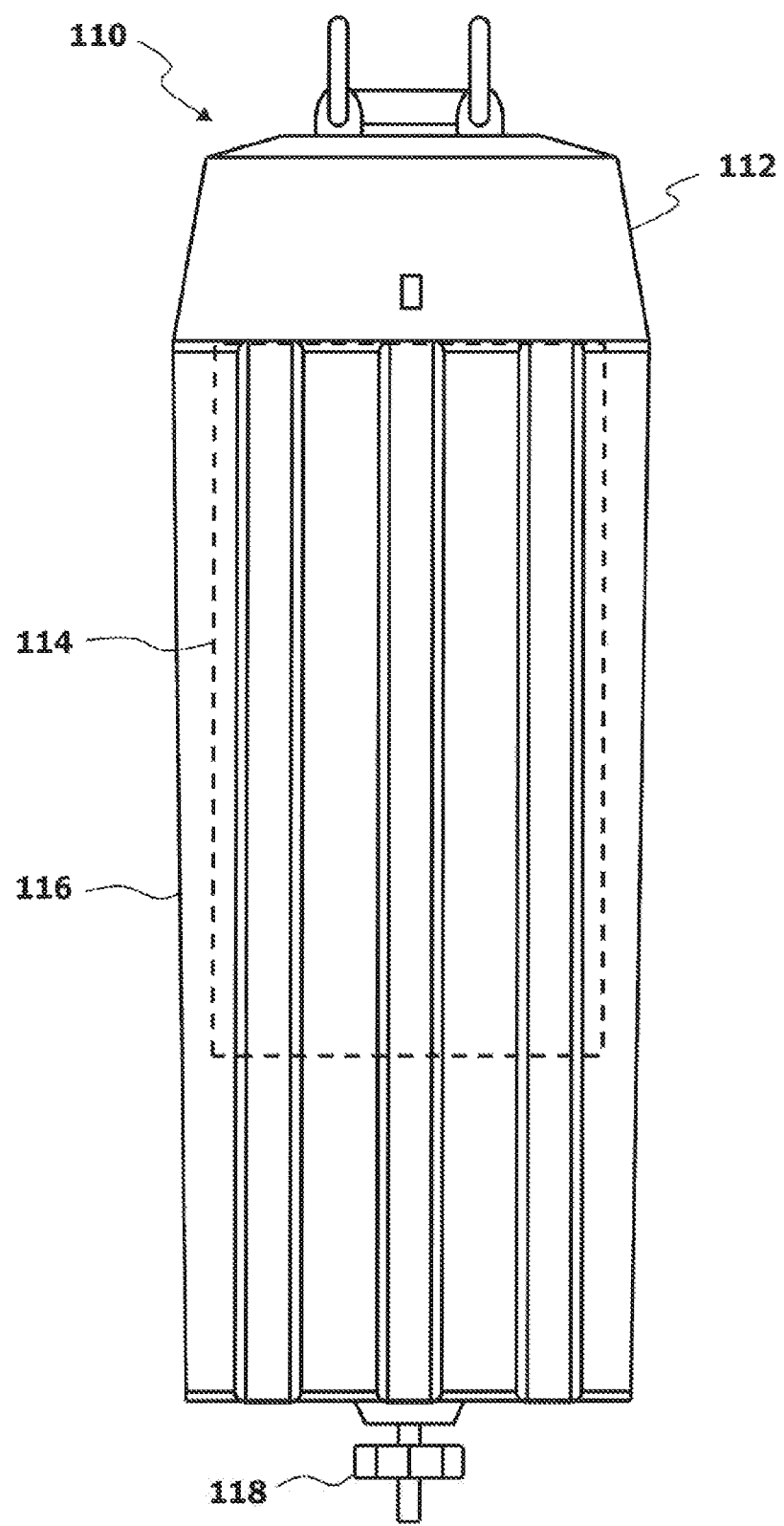
FIG. 5 is a front view illustrating the example of the fuel filter.

As illustrated in FIG. 4 and FIG. 5, the fuel filter 110 has an upper cover 112, in which an inlet and an outlet of two systems are formed, a filter element 114 detachably installed to the lower surface of the upper cover 112, and a filter body 116 detachably installed to the upper cover 112. The filter body 116 is an approximately cylindrical member with a bottom, which is transparent or translucent (either colored or colorless), and detachably fixed to the upper cover 112, accommodating the filter element 114 in the internal space thereof. Thus, the bottom portion of the filter body 116 functions as the visual check part through which the amount of the water separated from the fuel is visually checked.

Furthermore, a drain cock 118, through which the water separated from the fuel is drained, is attached to the bottom portion of the filter body 116. Hence, the water accumulated on the bottom of the filter body 116 can be drained to the outside by operating the drain cock 118.

The inlet and the outlet of the two systems formed on the upper cover 112 of the fuel filter 110 are protruded upward from the upper surface of the fuel tank 100, and the bottom portion of the filter body 116 of the fuel filter 110 and the drain cock 118 are protruded downward from the lower surface of the fuel tank 100. Hence, the filter body 116 has a length based on the vertical height of the fuel tank 100, and the filter element 114 accommodated therein has a length based on the filter body 116. With this arrangement, the entire length of the filter element 114 is increased and the fuel filtering area increases accordingly, thus making it possible to prolong the replacement interval of the filter element 114 for removing foreign matters from the fuel.

The fuel filter 110 is not limited to the configuration illustrated in FIG. 4 and FIG. 5, but the fuel filter 110 may have any configuration insofar as it has the visual check part for visually checking the amount of water separated from fuel and the drain cock 118 for draining water. Reference numeral 104 in FIG. 3 denotes a drain bolt detachably installed to the lower surface of the fuel tank 100.

Figure 6:
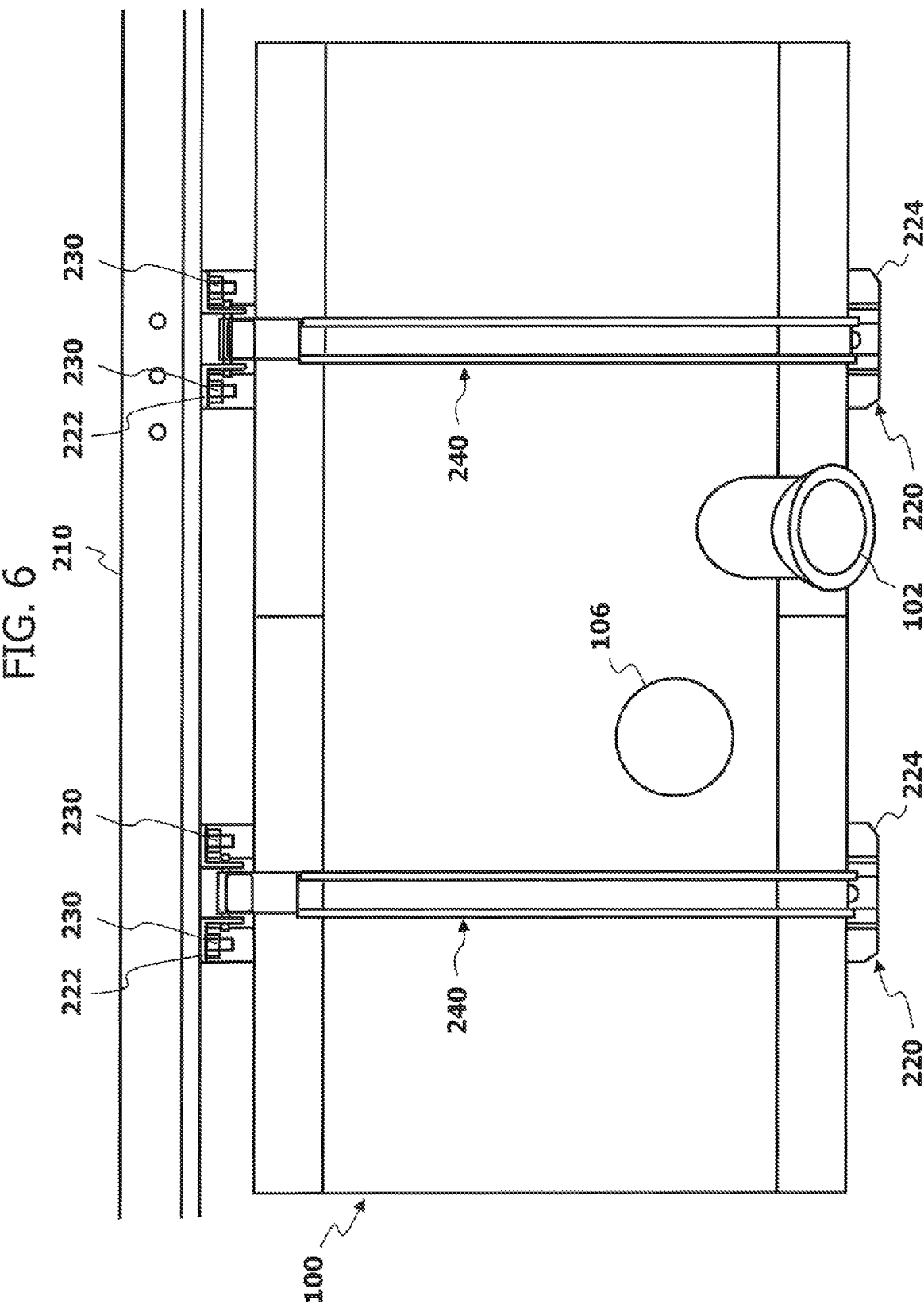
FIG. 6 is a plan view illustrating an example of a structure for installing the fuel filter to the fuel tank.
Figure 7:
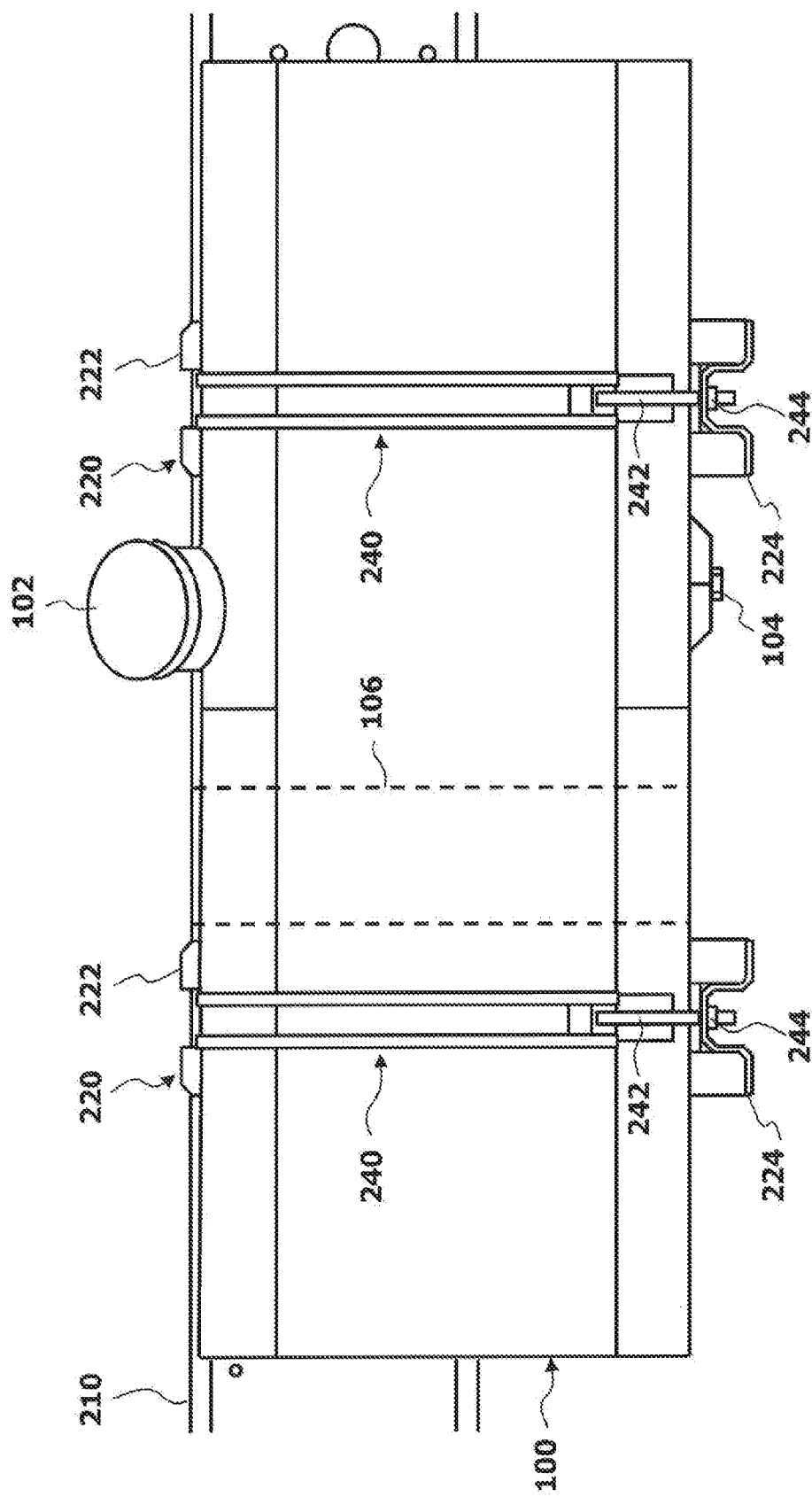
FIG. 7 is a side view illustrating the example of the structure for installing the fuel filter to the fuel tank.

In order to install the fuel filter 110 to the fuel tank 100, for example, a tube member 106 having an approximately cylindrical shape, is installed to the fuel tank 100 so that it vertically penetrates the fuel tank 100 between the top plate and the bottom plate thereof, as illustrated in FIG. 6 and FIG. 7. More specifically, approximately circular openings, for example, are formed in the top plate and the bottom plate of the fuel tank 100, and the tube member 106 is fixed by welding or the like to communicate between the two openings. In this embodiment, both end portions of the tube member 106 are fixed to the fuel tank 100 by, for example, welding the entire circumferences thereof so as to secure the liquid-tightness of the fuel tank 100.

The tube member 106 is not limited to the cylindrical shape, but the tube member 106 may have various other shapes, such as an elliptical cross-section and a polygonal shape having a quadrangular cross-section that fits the external shape of the fuel filter 110. Furthermore, an elastic member, such as a rubber member, may be interposed between the tube member 106 of the fuel tank 100 and the fuel filter 110 to avoid direct contact therebetween.

According to the common rail system described above, the fuel filter 110 is integrally formed with the fuel tank 100, thus eliminating the need for the space in which the fuel filter 110 is installed on the vehicle width outer side of the side frame 210 in the prior art. Hence, accessories, such as tool boxes, can be installed at the available space on the vehicle width outer side of the side frame 210, thus promoting the effective use of the vehicle space. Furthermore, the piping, including a hose that connects the fuel tank 100 to the fuel filter 110 so as to communicate with each other, is shorter, permitting a reduction in the number of components, such as clips.

The bottom portion of the filter body 116 of the fuel filter 110 and the drain cock 118 are protruded downward from the lower surface of the fuel tank 100, enabling an operator or the like to easily check visually the state of the fuel filter 110 from the vehicle width outer side and to operate the drain cock 118 to drain water as necessary. In particular, the fuel filter 110 is installed adjacently to the vehicle width outer side of the fuel tank 100, thus permitting easy visual check of the state of the fuel filter 110 and easy water drainage.

Furthermore, the fuel filter 110 is installed inside the tube member 106, so that installing the fuel filter 110 to the fuel tank 100 does not impair the liquid-tightness of the fuel tank 100. In addition, there is no need for the brackets for installing the fuel filter 110 to the side frame 210, and thus also promoting the reduction in weight.

Figure 8:
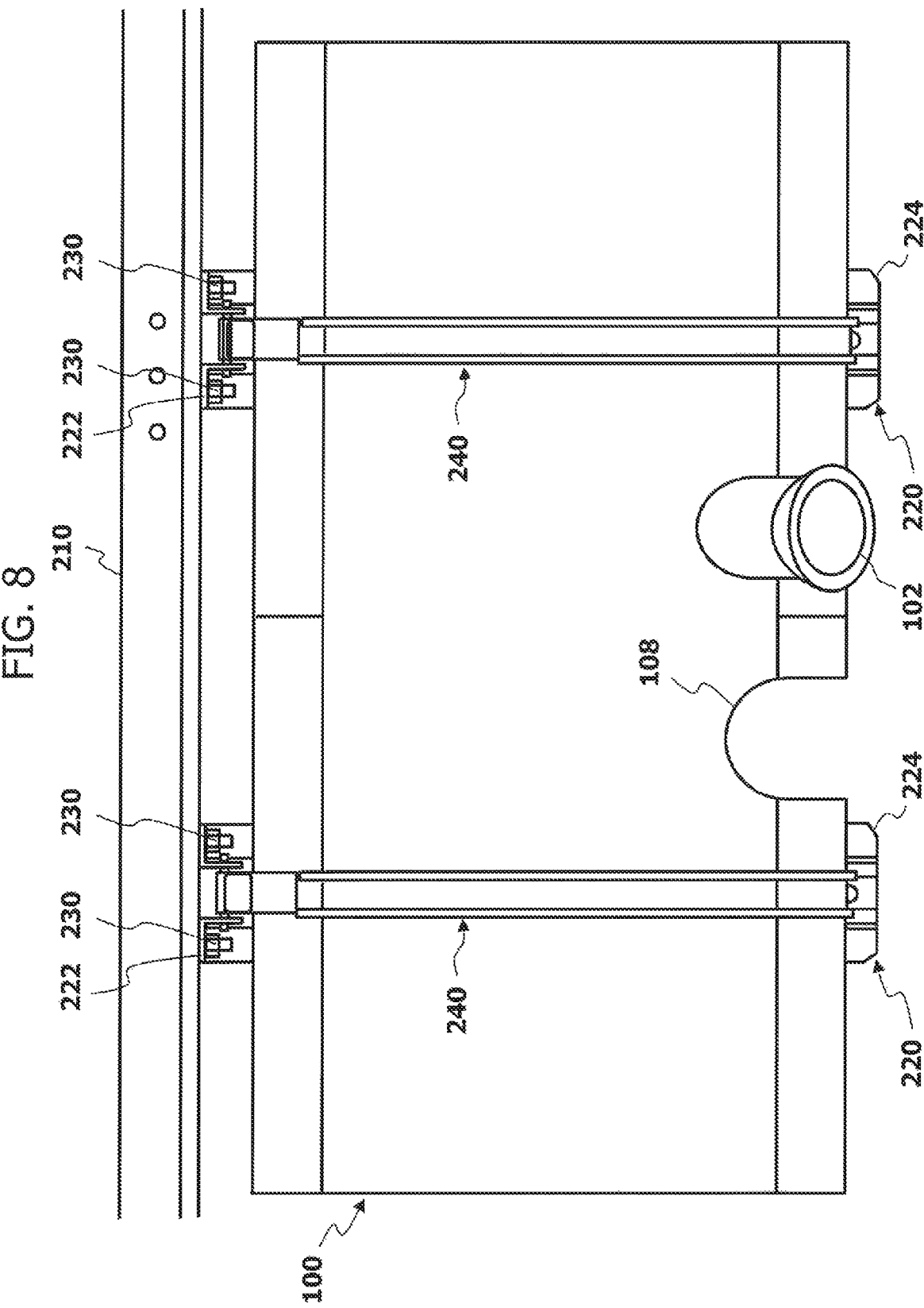
FIG. 8 is a plan view illustrating another example of the structure for installing the fuel filter to the fuel tank.
Figure 9:
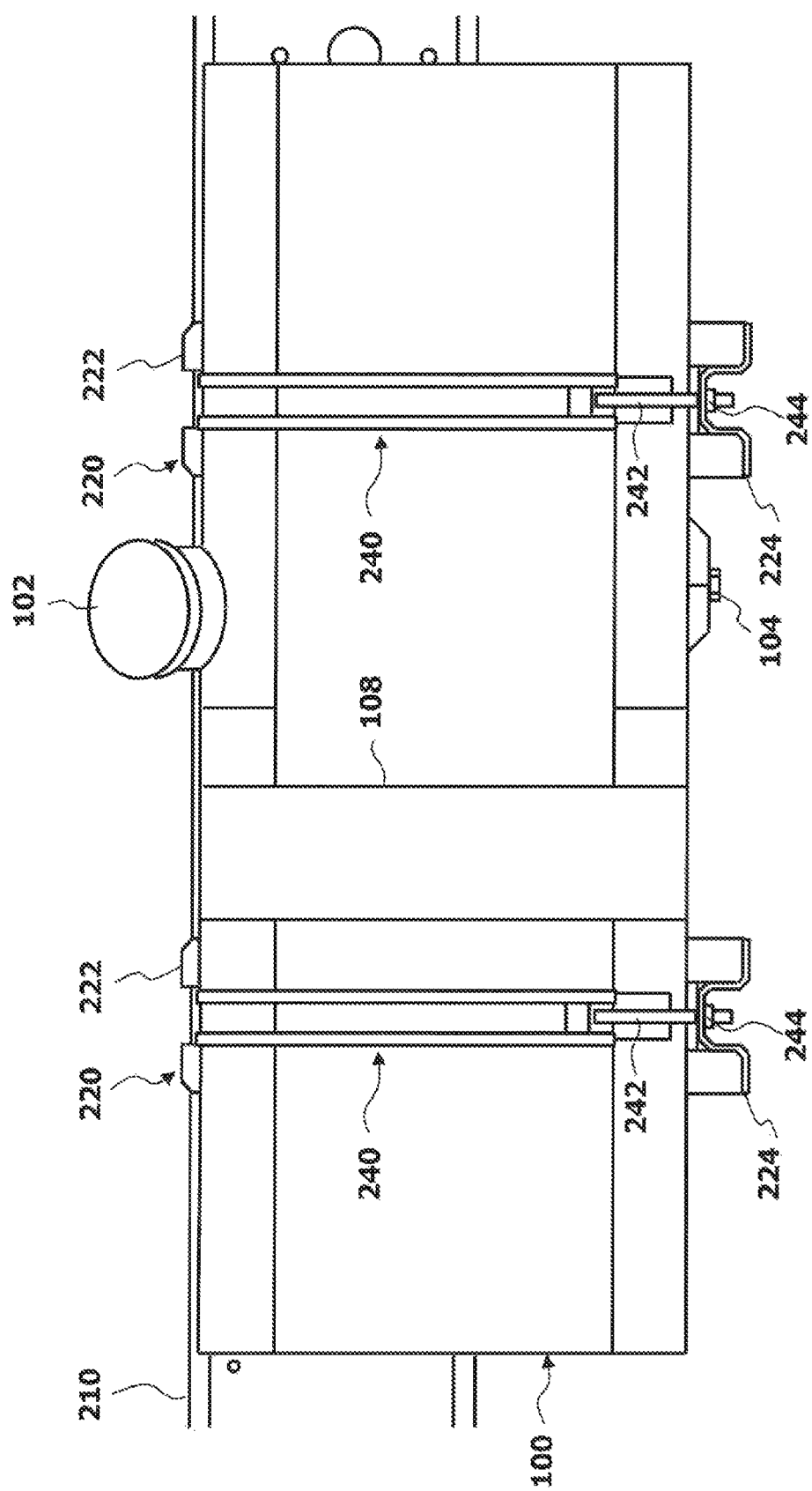
FIG. 9 is a side view illustrating the another example of the structure for installing the fuel filter to the fuel tank.

In order to install the fuel filter 110 to the fuel tank 100, as illustrated in FIG. 8 and FIG. 9, a recessed portion 108 may be formed by inwardly recessing the side surface of the fuel tank 100 that is positioned on the vehicle width outer side, and the fuel filter 110 may be installed to the recessed portion 108. In this case, the side plate, the top plate, and the bottom plate of the fuel tank 100 may be cut out as necessary, and a member having an approximately semicircular cross-section may be fixed to the cut-out portion by welding or the like. The recessed portion 108 is not limited to the shape having the approximately semicircular portion, and may have a shape that fits the fuel filter 110.

The fuel supply apparatus according to the present embodiment is not limited to the common rail system, but can be applied to a vehicle in which the fuel tank 100 is installed on the vehicle width outer side of the side frame 210. Furthermore, the fuel supply apparatus according to the present embodiment is not limited to a vehicle having a diesel engine, but the fuel supply apparatus can be applied to a vehicle having a gasoline engine, a hybrid vehicle, or the like.

It should also be understood that many modifications and variations of the described embodiments of the invention will be apparent to a person having an ordinary skill in the art without departing from the spirit and scope of the present invention as claimed in the appended claims.

What is claimed is:

1. A fuel supply apparatus for an internal combustion engine, comprising:
    a fuel tank installed on a vehicle width outer side of a side frame; and
    a fuel filter which is disposed in a fuel supply passage for supplying fuel stored in the fuel tank to an internal combustion engine and which has a drain cock and a visual check part,
    wherein:
    the fuel filter is installed, vertically penetrating the fuel tank,
    the fuel filter is installed inside a tube member,
    the tube member vertically penetrates the fuel tank between a top plate and a bottom plate of the fuel tank while securing a liquid-tightness of the fuel tank,
    a top opening is formed in the top plate of the fuel tank,
    a bottom opening is formed in the bottom plate of the fuel tank,
    the tube member extends from the top plate of the fuel tank to the bottom plate of the fuel tank,
    a first end of the tube member is fixed to the top opening of the top plate, and
    a second end of the tube member is fixed to the bottom opening of the bottom plate.

2. The fuel supply apparatus for an internal combustion engine according to claim 1, wherein
    the drain cock and the visual check part of the fuel filter are protruded downward from a lower surface of the fuel tank.

3. The fuel supply apparatus for an internal combustion engine according to claim 1, wherein
    the fuel filter is installed to a portion of the fuel tank that is adjacent to the vehicle width outer side.

4. The fuel supply apparatus for an internal combustion engine according to claim 1, wherein
    the internal combustion engine is a diesel engine.

5. A fuel filter installing method in which a fuel filter, which is disposed in a fuel supply passage for supplying fuel stored in a fuel tank installed on a vehicle width outer side of a side frame to an internal combustion engine and which has a drain cock and a visual check part, is installed such that the fuel filter vertically penetrates the fuel tank,
    wherein:
    the fuel filter is installed inside a tube member,
    the tube member vertically penetrates the fuel tank between a top plate and a bottom plate of the fuel tank while securing a liquid-tightness of the fuel tank,
    a top opening is formed in the top plate of the fuel tank,
    a bottom opening is formed in the bottom plate of the fuel tank,
    the tube member extends from the top plate of the fuel tank to the bottom plate of the fuel tank,
    a first end of the tube member is fixed to the top opening of the top plate, and
    a second end of the tube member is fixed to the bottom opening of the bottom plate.

6. The fuel filter installing method according to claim 5, wherein the drain cock and the visual check part of the fuel filter are protruded downward from a lower surface of the fuel tank.

7. The fuel filter installing method according to claim 5, wherein the fuel filter is installed to a portion of the fuel tank that is adjacent to the vehicle width outer side.

* * * * *